(12) United States Patent
Narita et al.

(10) Patent No.: US 9,573,560 B1
(45) Date of Patent: Feb. 21, 2017

(54) VEHICLE POP-UP HOOD DEVICE ACTUATOR AND VEHICLE POP-UP HOOD DEVICE

(71) Applicant: TOYOTA JIDOSHA KABUSHIKI KAISHA, Toyota-shi, Aichi-ken (JP)

(72) Inventors: Sotaro Narita, Toyota (JP); Joji Aoyama, Kiyosu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/233,491

(22) Filed: Aug. 10, 2016

(30) Foreign Application Priority Data

Aug. 26, 2015 (JP) .................................. 2015-167109

(51) Int. Cl.
*B60R 21/38* (2011.01)
*B60R 21/26* (2011.01)
*F42B 3/04* (2006.01)
*C06D 5/00* (2006.01)
*F15B 15/14* (2006.01)
*B60R 21/264* (2006.01)

(52) U.S. Cl.
CPC .............. *B60R 21/38* (2013.01); *B60R 21/26* (2013.01); *B60R 21/264* (2013.01); *C06D 5/00* (2013.01); *F15B 15/1438* (2013.01); *F42B 3/04* (2013.01)

(58) Field of Classification Search
CPC ........ B60R 21/38; B60R 21/26; B60R 21/264; F42B 3/04; C06D 5/00; F15B 15/1438
See application file for complete search history.

(56) References Cited

U.S. PATENT DOCUMENTS

| 7,374,008 | B1* | 5/2008 | Neal | B60R 21/38 |
| | | | | 180/274 |
| 7,475,752 | B2* | 1/2009 | Borg | B60R 21/38 |
| | | | | 180/274 |
| 8,522,539 | B2* | 9/2013 | Ukon | B60R 21/013 |
| | | | | 180/274 |
| 9,206,089 | B2* | 12/2015 | Inuzuka | B60R 21/38 |
| 9,340,467 | B2* | 5/2016 | Aoyama | C06D 5/00 |
| 2011/0314809 | A1* | 12/2011 | Laspesa | F15B 15/1476 |
| | | | | 60/638 |

(Continued)

FOREIGN PATENT DOCUMENTS

| DE | 102011116590 A1 * | 4/2013 | ............. B60R 21/38 |
| JP | 2013-071544 A | 4/2013 | |

(Continued)

*Primary Examiner* — Faye M Fleming
(74) *Attorney, Agent, or Firm* — Oliff PLC

(57) ABSTRACT

A vehicle pop-up hood device actuator includes a main body section; a cylinder that covers a portion on one axial direction side of the main body section, that is moved toward the one axial direction side of the main body section by generated gas to lift a hood of a vehicle to a lifted position, and that is configured so as to be capable of moving to a retention position; a sealing member that is formed in a ring shape and that forms a seal between the main body section and a general face; a retention member that abuts on an inner peripheral face of the cylinder and retains the cylinder at the retention position; and an enlarged diameter face that is disposed at a radial direction outer side of the main body section with respect to the sealing member at the lifted position.

4 Claims, 11 Drawing Sheets

(56) References Cited

U.S. PATENT DOCUMENTS

| | | | |
|---|---|---|---|
| 2014/0339010 A1* | 11/2014 | Wilmot | B60R 21/38 180/271 |
| 2014/0360357 A1* | 12/2014 | Wilmot | F15B 15/149 92/169.1 |
| 2015/0075402 A1* | 3/2015 | Henck | C06D 5/00 102/530 |
| 2016/0001736 A1* | 1/2016 | Van Hooser | F15B 15/19 89/1.14 |
| 2016/0114759 A1* | 4/2016 | Takaya | B60R 21/38 102/530 |

FOREIGN PATENT DOCUMENTS

| | | | | |
|---|---|---|---|---|
| JP | 2014-133535 A | | 7/2014 | |
| JP | WO 2015107778 A1 * | | 7/2015 | B60R 21/38 |
| JP | 2016-128293 A | | 7/2016 | |
| KR | EP 2962904 A1 * | | 1/2016 | B60R 21/38 |

* cited by examiner

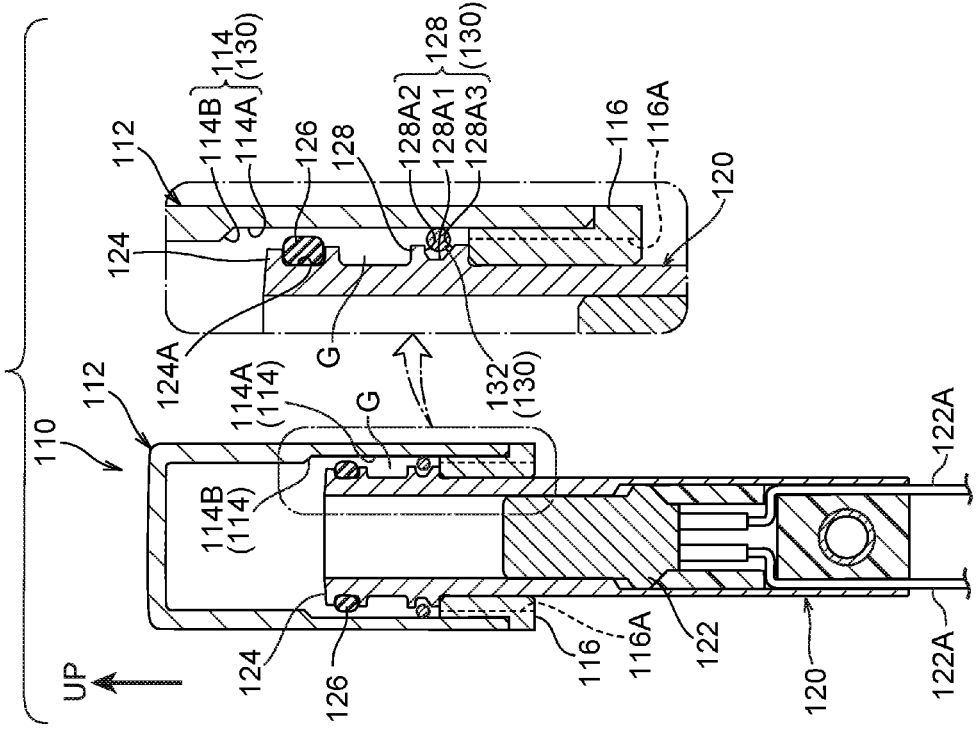
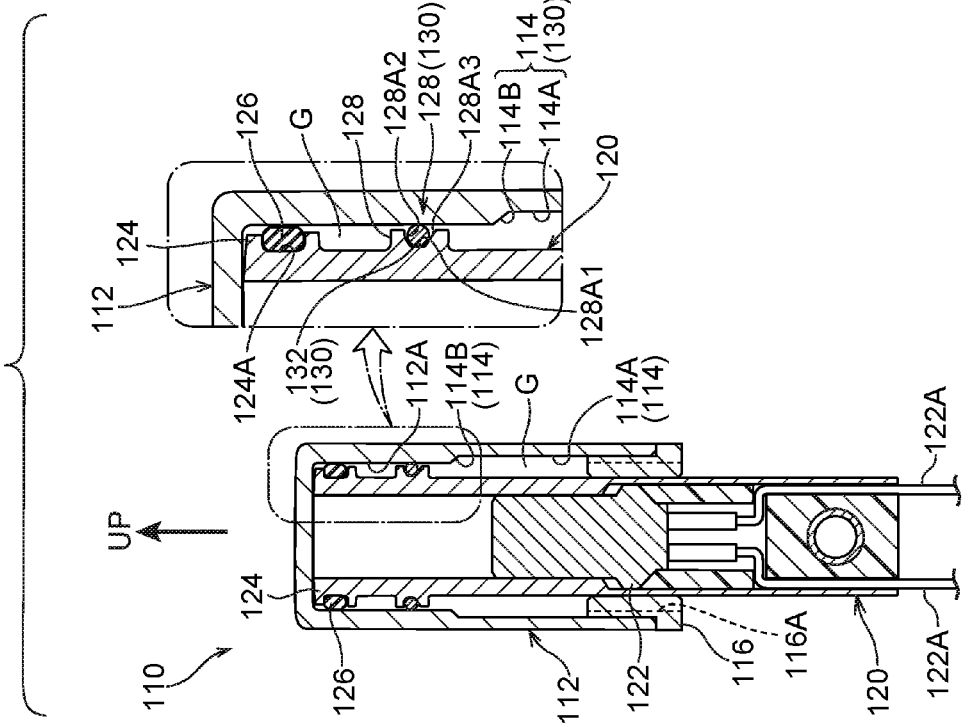

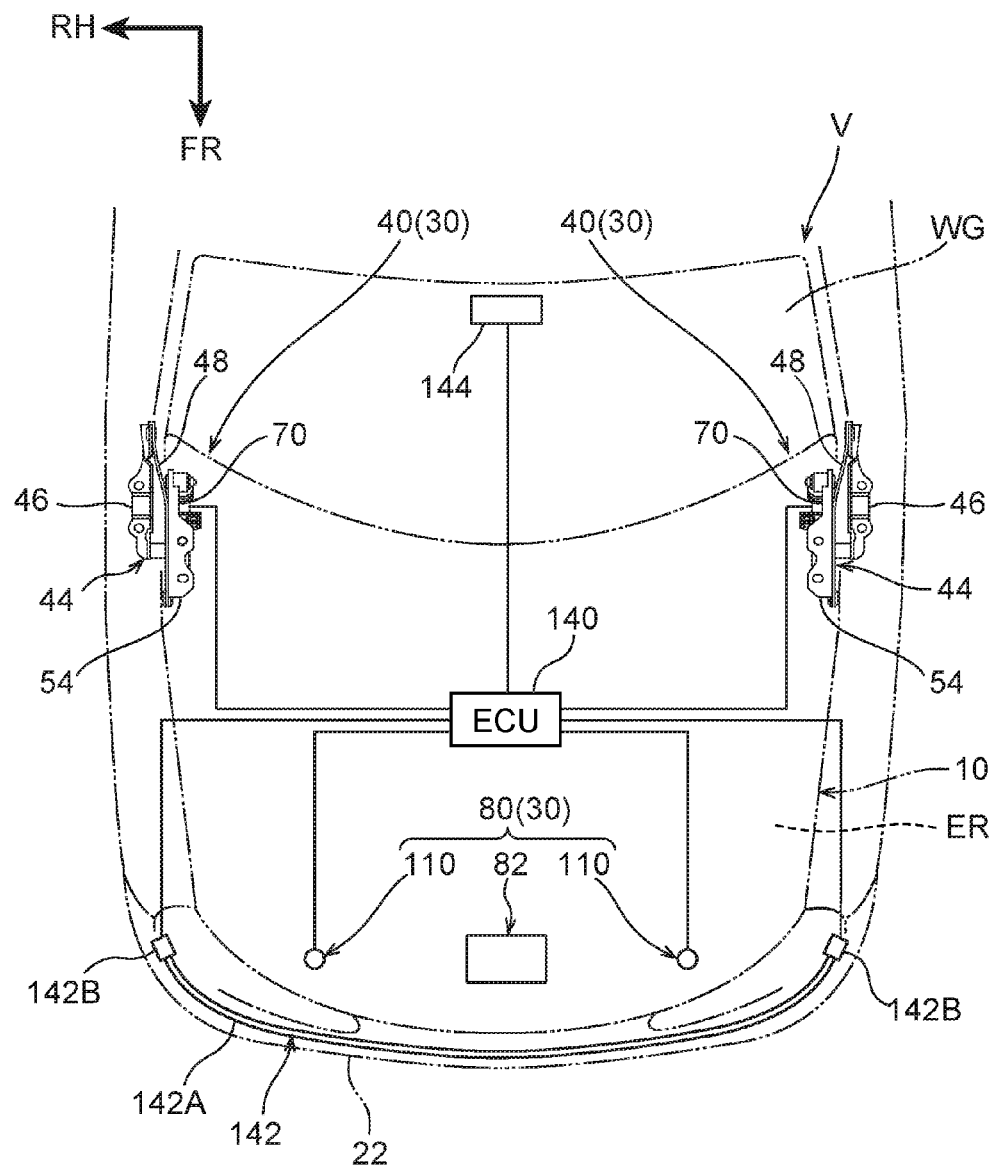

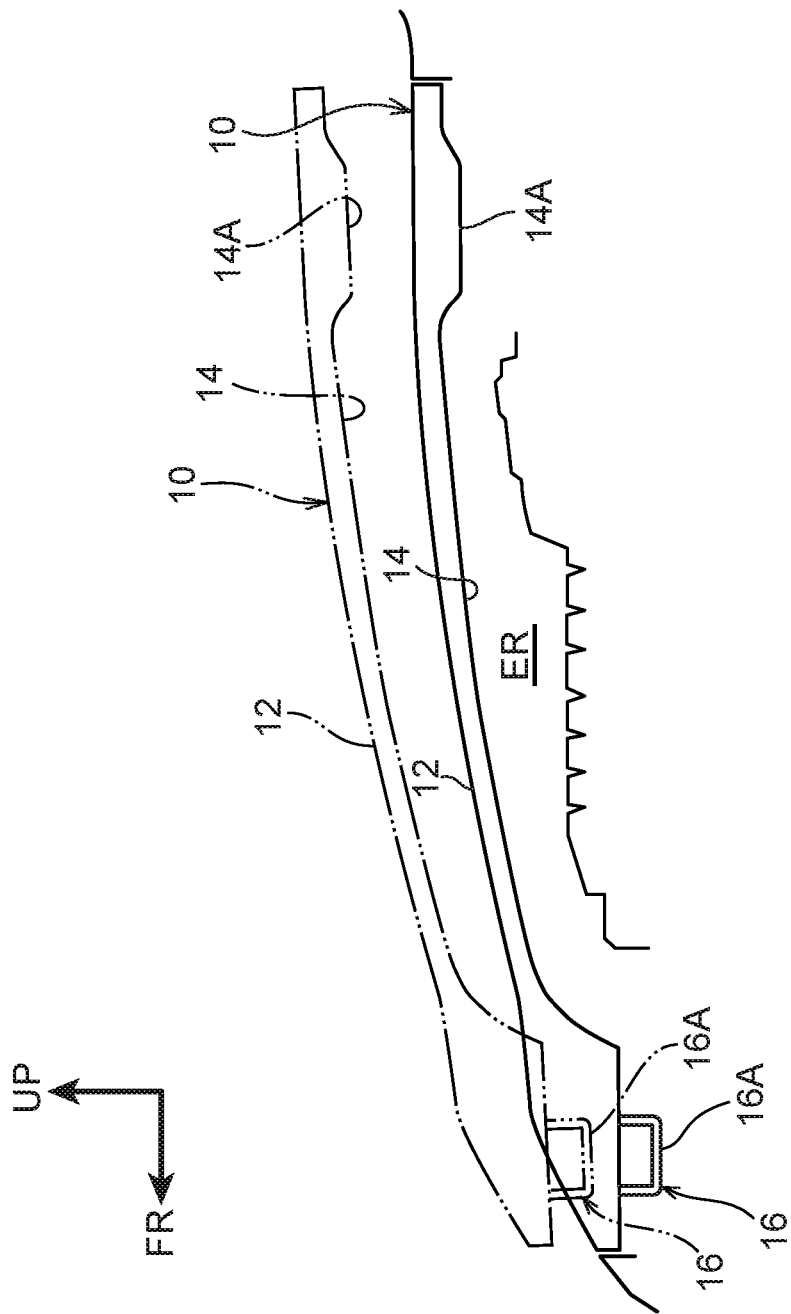

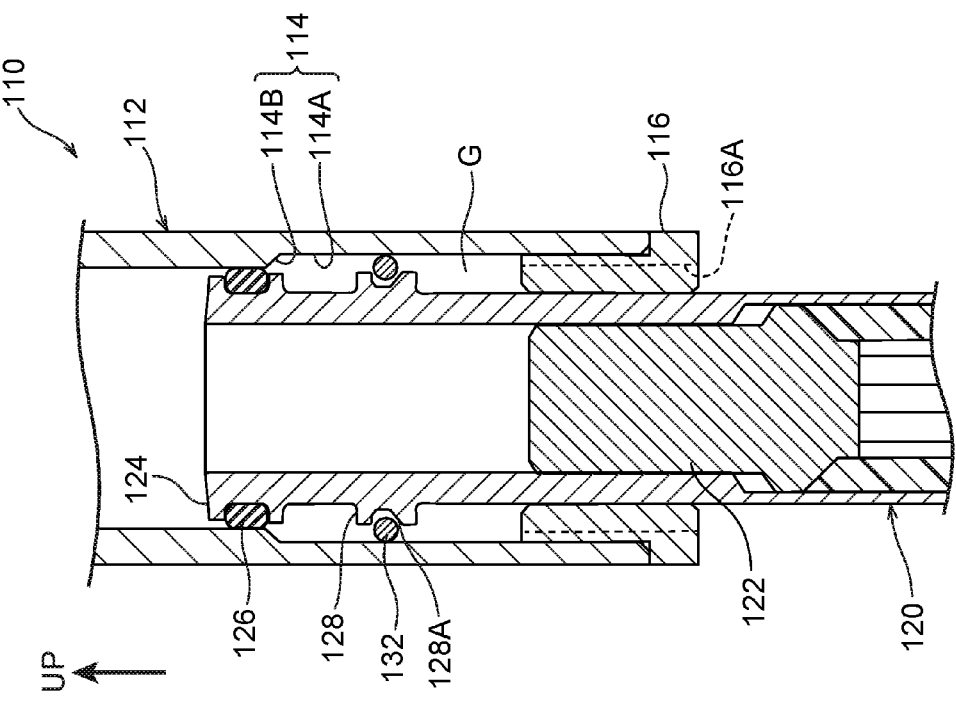
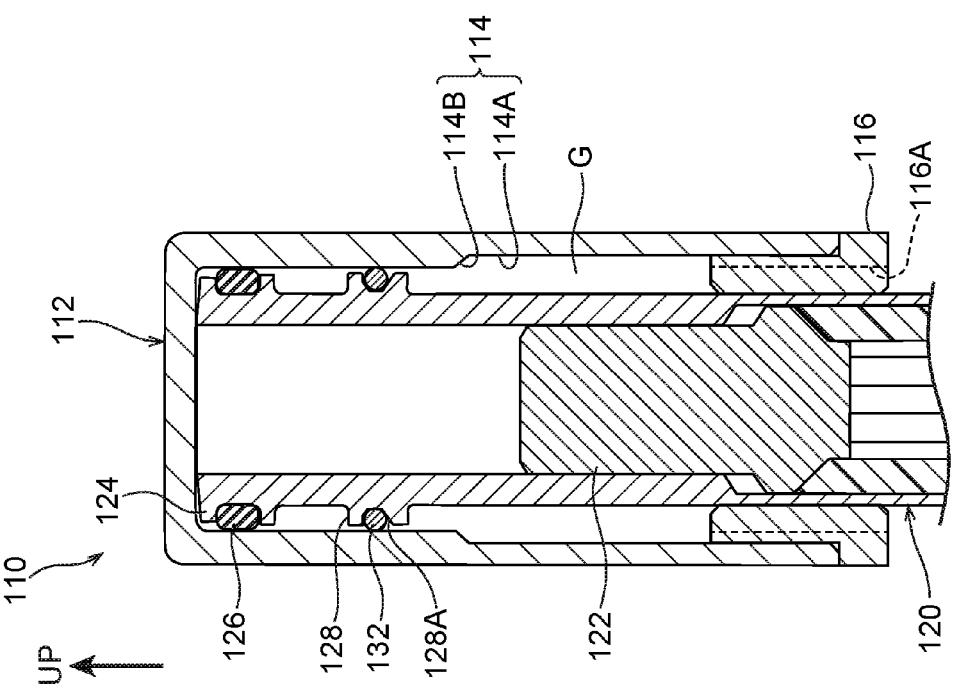

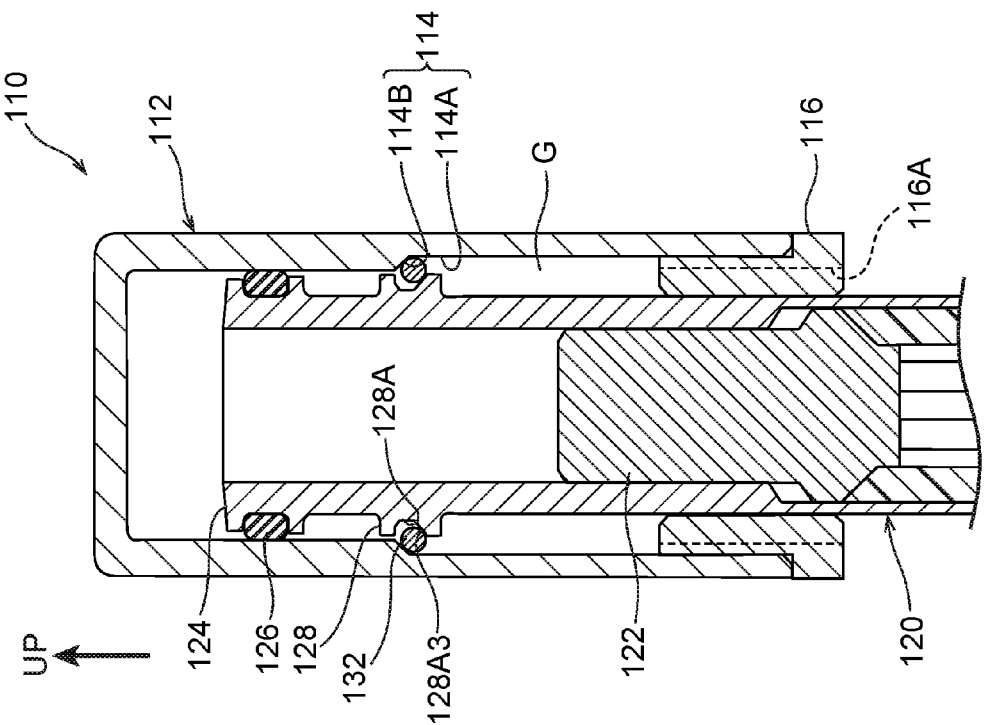
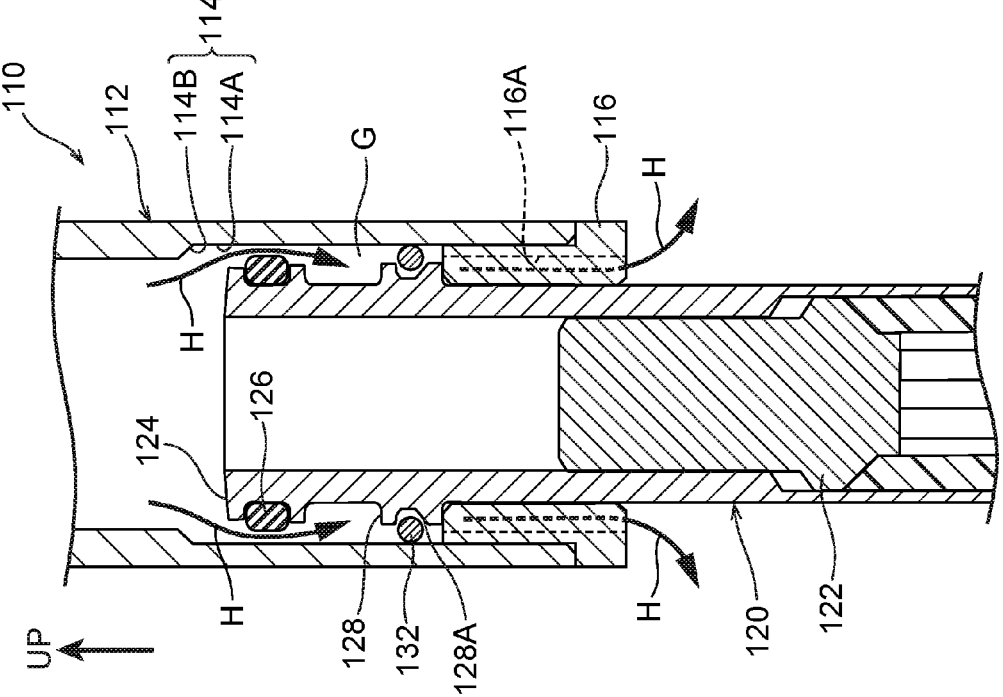

VEHICLE POP-UP HOOD DEVICE ACTUATOR AND VEHICLE POP-UP HOOD DEVICE

CROSS-REFERENCE TO RELATED APPLICATION

This application claims priority under 35 USC 119 from Japanese Patent Application No. 2015-167109 filed Aug. 26, 2015, the disclosure of which is incorporated by reference herein.

BACKGROUND

Technical Field

Technology disclosed herein relates to a vehicle pop-up hood device actuator that lifts a vehicle hood, and to a vehicle pop-up hood device.

Related Art

Japanese Patent Application Laid-Open (JP-A) No. 2013-71544 describes what is known as a piston cylinder type actuator that lifts a vehicle hood. Specifically, the actuator is configured including a tube shaped cylinder, and a piston rod housed inside the cylinder. A piston portion of the piston rod is provided with a lock pin. When a gas generator provided in the cylinder is actuated, the piston rod rises with respect to the cylinder by the gas generated by the gas generator, thereby lifting the vehicle hood. When this is performed, the lock pin anchors to an anchor face of the cylinder, and the piston rod is retained by the lock pin. The lifting of the hood is thereby retained, protecting a pedestrian falling onto the hood. Note that an actuator that lifts a vehicle hood is also described in JP-A No. 2014-133535.

If high pressure gas remains inside the cylinder after actuation of the actuator, a reaction force from the hood acting on the pedestrian falling onto the hood could increase, thereby raising the pedestrian injury criteria. Forming gas escape holes in the cylinder to release high pressure gas inside the cylinder, for example, may be considered in order to reduce the reaction force on the pedestrian from the hood.

However, when gas escape holes are formed in the cylinder, there is a possibility of a lock pin catching on the peripheries of openings of the gas escape holes when the piston rod rises with respect to the cylinder during actuation of the actuator. There is accordingly a need for high assembly precision of the actuator in order to prevent the lock pin from catching on the peripheries of the openings of the gas escape holes. In other words, it is desirable for the actuator have a structure in which the effect of assembly precision on actuation is suppressed.

An exemplary embodiment of the present invention provides a vehicle pop-up hood device actuator and a vehicle pop-up hood device capable of lowering pedestrian injury criteria, while suppressing the effect of assembly precision on actuation.

SUMMARY

A vehicle pop-up hood device actuator according to a first aspect of the present invention includes: a main body section that is formed in a tube shape, and that internally includes a gas generator; a cylinder that is formed in a bottomed tube shape closed off at one axial direction side, that has an inner peripheral face at the one axial direction side configuring a general face, that covers a portion at the one axial direction side of the main body section, that is moved toward the one axial direction side of the main body section by gas generated by the gas generator to lift a hood of a vehicle to a lifted position, and that is configured so as to be capable of moving to a retention position further toward another axial direction side of the main body section than the lifted position; a sealing member that is formed in a ring shape, that is provided at an outer peripheral portion at one axial direction end portion of the main body section, and that forms a seal between the main body section and the general face; a retention member that is provided at the outer peripheral portion of the main body section at a position further toward the another axial direction side of the main body section than the sealing member, that abuts on the inner peripheral face of the cylinder, and that retains the cylinder by engaging with the cylinder at the retention position; and an enlarged diameter face that configures an inner peripheral face at the another axial direction side of the cylinder, that has an internal diameter set larger than both an internal diameter of the general face and an external diameter of the sealing member, and that is disposed at a radial direction outer side of the main body section with respect to the sealing member at the lifted position.

In the vehicle pop-up hood device actuator (referred to below as the "actuator") configured as described above, the actuator is configured including the main body section and the cylinder. The main body section is formed in a tube shape, and the gas generator is provided inside the main body section. The cylinder is formed in a bottomed tube shape closed off at the one axial direction side, and the inner peripheral face at the one axial direction side of the cylinder configures the general face. The portion at the one axial direction side of the main body section is covered by the cylinder.

The sealing member that is formed in a ring shape is provided at the outer peripheral portion at the one axial direction end portion of the main body section. The sealing member forms a seal between the main body section and the general face of the cylinder. Moreover, the retention member is provided at the outer peripheral portion of the main body section at a position further toward the another axial direction side of the main body section than the sealing member, and the retention member abuts on the inner peripheral face of the cylinder. Accordingly, when the cylinder is moved in the axial direction of the main body section, frictional force arises between the retention member and the cylinder. When the gas generator is actuated, the cylinder is moved toward the one axial direction side of the main body section by the generated gas, and the hood of the vehicle is lifted to the lifted position. When the cylinder is moved to the retention position further toward the another axial direction side of the main body section than the lifted position, the retention member engages with the cylinder, whereby the cylinder is retained by the retention member.

Note that the inner peripheral face on an opening end side of the cylinder is configured by the enlarged diameter face. The internal diameter of the enlarged diameter face is set larger than both the internal diameter of the general face and the external diameter of the sealing member. At the lifted position, the enlarged diameter face is disposed at the radial direction outer side of the main body section with respect to the sealing member. Gas inside the cylinder accordingly flows out from between the enlarged diameter face and the sealing member toward the opening side of the cylinder. This thereby enables gas inside the cylinder to escape without forming gas escape holes in the cylinder. The effect of the assembly precision of the actuator on actuation of the actuator can accordingly be suppressed in comparison to configurations in which gas escape holes are formed in the cylinder.

At the lifted position, the gas inside the cylinder escapes, thereby enabling high pressure gas to be suppressed from remaining inside the cylinder. This thereby enables a reaction force from the hood on the pedestrian falling onto the hood to be reduced. The cylinder is moved from the lifted position to the retention position, against the frictional force between the retention member and the cylinder, when a specific load toward the vehicle lower side from the pedestrian falling onto the hood acts on the cylinder. This thereby enables collision energy to the pedestrian to be absorbed by the frictional force between the retention member and the cylinder. The pedestrian injury criteria can accordingly be lowered.

A vehicle pop-up hood device actuator according to a second aspect of the present invention is the vehicle pop-up hood device actuator according to the first aspect of the present invention, wherein a boundary portion between the enlarged diameter face and the general face at the inner peripheral face of the cylinder configures an inclined face, and the inclined face is inclined toward the one axial direction side on progression toward a radial direction inner side of the cylinder as viewed in vertical cross-section.

In the actuator configured as described above, the inclined face configuring the boundary portion between the enlarged diameter face and the general face is inclined toward the one axial direction side on progression toward the radial direction inner side of the cylinder as viewed in vertical cross-section. This thereby enables the sealing member and the retention member to be suppressed from catching on the inclined face in comparison to cases in which, for example, an inclined face is formed along a direction orthogonal to the axial direction of the cylinder as viewed in vertical cross-section. This thereby enables damage to the sealing member and the retention member to be suppressed, thereby enabling the reliability of the actuator to be improved.

A vehicle pop-up hood device actuator according to a third aspect of the present invention is the vehicle pop-up hood device actuator according to the second aspect of the present invention, wherein the inclined face engages with the retention member at the retention position.

The actuator configured as described above enables the inclined face of the enlarged diameter portion to be utilized in the engagement of the cylinder with the retention member so as to retain the cylinder at the retention position.

A vehicle pop-up hood device according to a fourth aspect of the present invention includes the vehicle pop-up hood device actuator of any one of the first aspect to the third aspect of the present invention, provided at a lower side of a hood of a vehicle, and a controller that is electrically connected to the vehicle pop-up hood device actuator, and that actuates the vehicle pop-up hood device actuator.

The vehicle pop-up hood device configured as described above enables good lifting of the hood to the lifted position by the actuator, and also enables collision energy to a pedestrian to be absorbed.

As described above, the vehicle pop-up hood device actuator of the present disclosure is capable of lowering pedestrian injury criteria, while suppressing the effect of assembly precision on actuation.

BRIEF DESCRIPTION OF THE DRAWINGS

Exemplary embodiments of the present invention will be described in detail based on the following figures, wherein:

FIG. 1A is a vertical cross-section illustrating the inside of a front actuator according to an exemplary embodiment, illustrating a non-actuated state of the front actuator;

FIG. 1B is a vertical cross-section illustrating the inside of a front actuator according to the present exemplary embodiment, illustrating a state of the front actuator after actuation;

FIG. 2 is a plan view illustrating an overall configuration of a vehicle pop-up hood device applied with a front actuator according to the present exemplary embodiment;

FIG. 7 is a side cross-section schematically illustrating a state in which an engine room is closed off by a hood illustrated in FIG. 2, as viewed from a vehicle left side;

FIG. 8A is a vertical cross-section illustrating an enlargement of relevant portions of the front actuator illustrated in FIG. 1A;

FIG. 8B is a vertical cross-section illustrating a state immediately prior to releasing gas inside a cylinder after actuation of the front actuator;

FIG. 9A is a vertical cross-section illustrating a state in which a cylinder of the front actuator is disposed at a lifted position and gas is escaping from inside the cylinder;

FIG. 9B is a vertical cross-section illustrating a state in which the cylinder has retracted from the state in FIG. 9A with respect to an actuator main body and is retained at a retention position;

DETAILED DESCRIPTION

Figure 3:
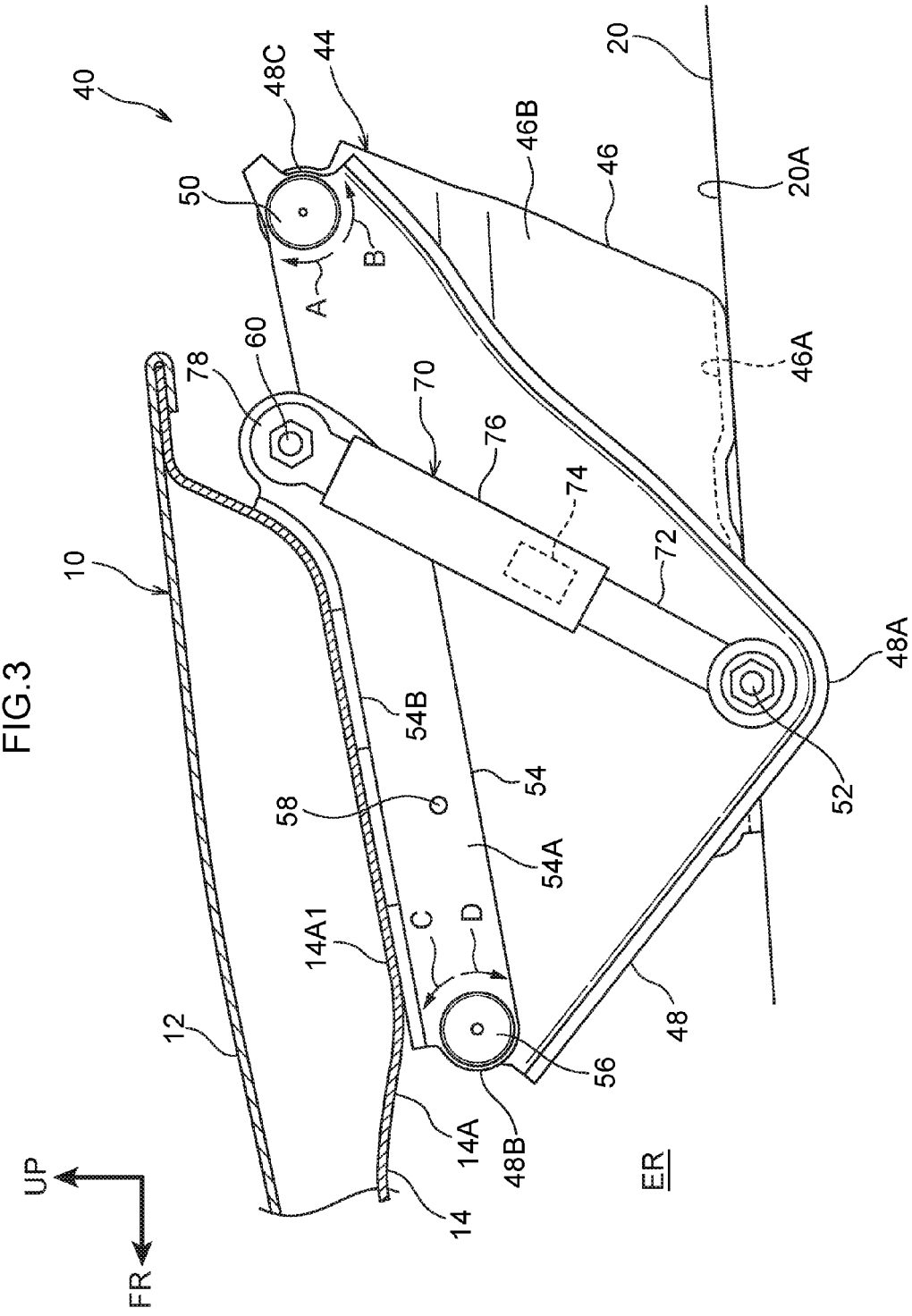
FIG. 3 is a side view illustrating an enlargement of a rear pop-up hood device disposed on the right side of the vehicle illustrated in FIG. 2, as viewed from a vehicle width direction central side.

Explanation follows regarding a vehicle pop-up hood device 30 (referred to below as the "PUH device 30") applied with a front side actuator 110 serving as "a vehicle pop-up hood device actuator" according to an exemplary embodiment, with reference to the drawings. Note that in the drawings, the arrow FR indicates a vehicle front direction, the arrow UP indicates a vehicle upward direction, and the arrow RH indicates a vehicle right direction of a vehicle (automobile) V applied with the PUH device 30, as appropriate. In the following explanation, unless specifically stated otherwise, reference simply to the front and rear, up and down, and left and right directions indicates front and rear in a vehicle front-rear direction, up and down in a vehicle up-down direction, and left and right in a vehicle left-right direction (vehicle width direction).

As illustrated in FIG. 2, the PUH device 30 is configured including rear pop-up hood devices 40 (referred to below as the "rear PUH devices 40") that lift a rear end section of a hood 10 provided at a front section of the vehicle V, and a front pop-up hood device 80 (referred to below as the "front PUH device 80") that lifts a front end section of the hood 10. The PUH device 30 further includes an ECU 140, this being an example of a "controller" according to technology disclosed herein, that actuates the rear PUH devices 40 and the front PUH device 80. In the event of a collision between the vehicle V and a pedestrian P, the hood 10 is lifted (popped up) by the PUH device 30 (see FIG. 10). First, explanation is given regarding the hood 10, followed by explanation regarding the rear PUH devices 40, the front PUH device 80, and the ECU 140.

Hood 10

The hood 10 is formed in a substantially rectangular shape in plan view, and covers an engine room (power unit compartment) ER provided at the front section of the vehicle V from an upper side. As illustrated in FIG. 7, the hood 10 is configured including a hood outer panel 12 and a hood inner panel 14. The hood outer panel 12 configures a portion on the vehicle outer side of the hood 10 (on the opposite side to the engine room ER), and configures a design face of the vehicle V. The hood inner panel 14 configures a portion on the engine room ER side of the hood 10. A terminal portion of the hood inner panel 14 is joined to a terminal portion of the hood outer panel 12 by hemming (see FIG. 3).

A hood striker 16 is provided at a vehicle width direction intermediate portion of the front end section of the hood 10. The hood striker 16 projects out from the hood 10 toward a lower side. As viewed from the side, the hood striker 16 is formed substantially in a U-shape opening toward the upper side, and an open end portion of the hood striker 16 is joined to the hood 10. A lower end portion of the hood striker 16 configures an anchor portion 16A. The anchor portion 16A extends in the front-rear direction. In a state in which the engine room ER is closed off by the hood 10 (the position illustrated by solid lines in FIG. 7; this position is referred to below as the "closed position"), the hood striker 16 is anchored to a hood lock device 82 of the front PUH device 80, described later. The front end section of the hood 10 is thereby fixed to the vehicle body.

As illustrated in FIG. 3, a protruding portion 14A is formed at a rear end side (rear section side) of the hood inner panel 14. The protruding portion 14A protrudes to the lower side of the hood inner panel 14, and a bottom wall 14A1 of the protruding portion 14A is disposed substantially parallel to the hood outer panel 12 as viewed in side cross-section.

Rear PUH Device 40

As illustrated in FIG. 2, the rear PUH devices 40 are respectively installed at both vehicle width direction end portions of the rear end section of the hood 10. The pair of left and right rear PUH devices 40 are configured with left-right symmetry to each other. Accordingly, explanation follows regarding the rear PUH device 40 disposed on the right side, and explanation regarding the rear PUH device 40 disposed on the left side is omitted.

Figure 4:
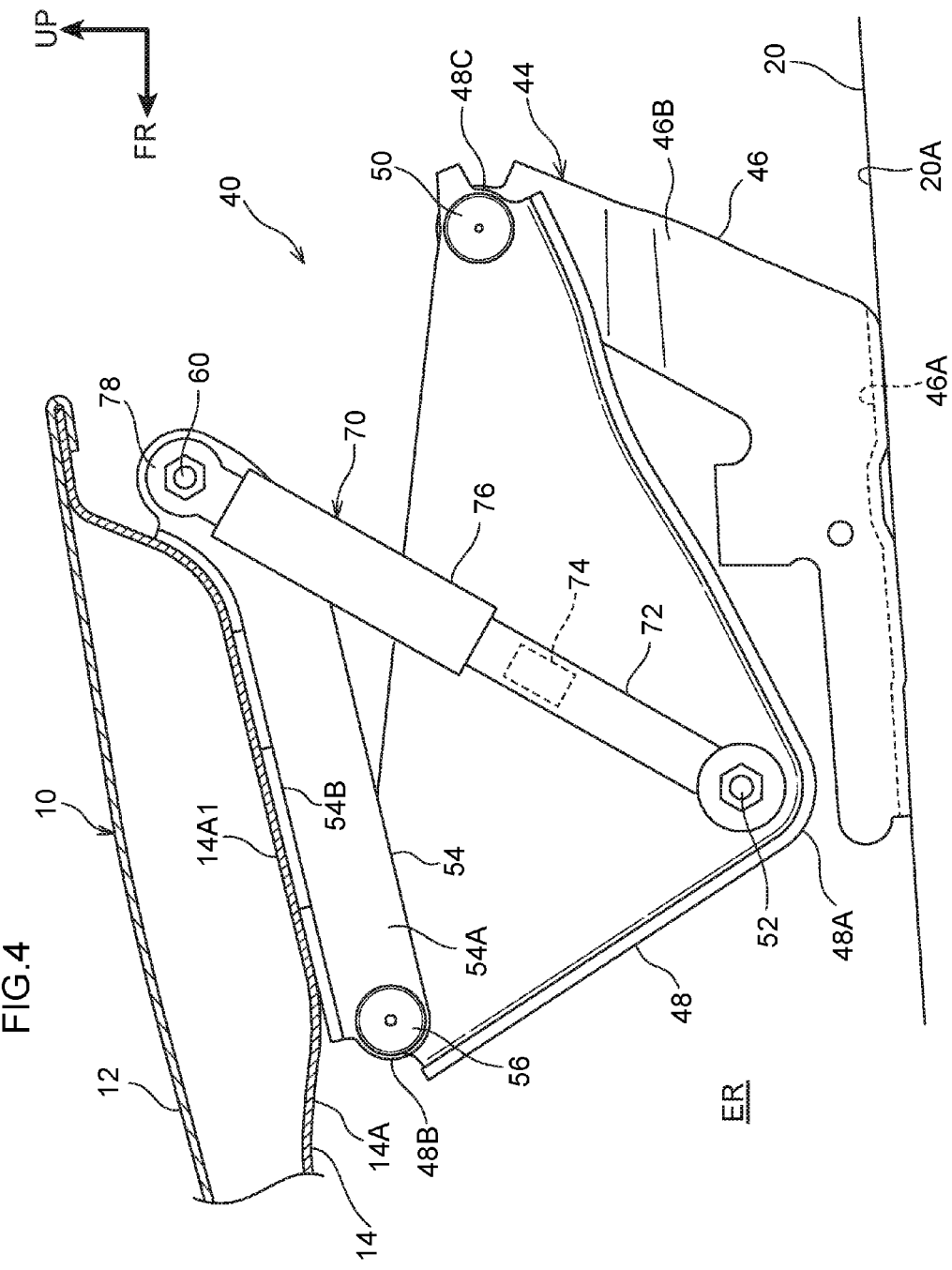
FIG. 4 is a side view illustrating an actuated state of a pop-up mechanism section illustrated in FIG. 3, as viewed from the vehicle width direction central side.
Figure 10:
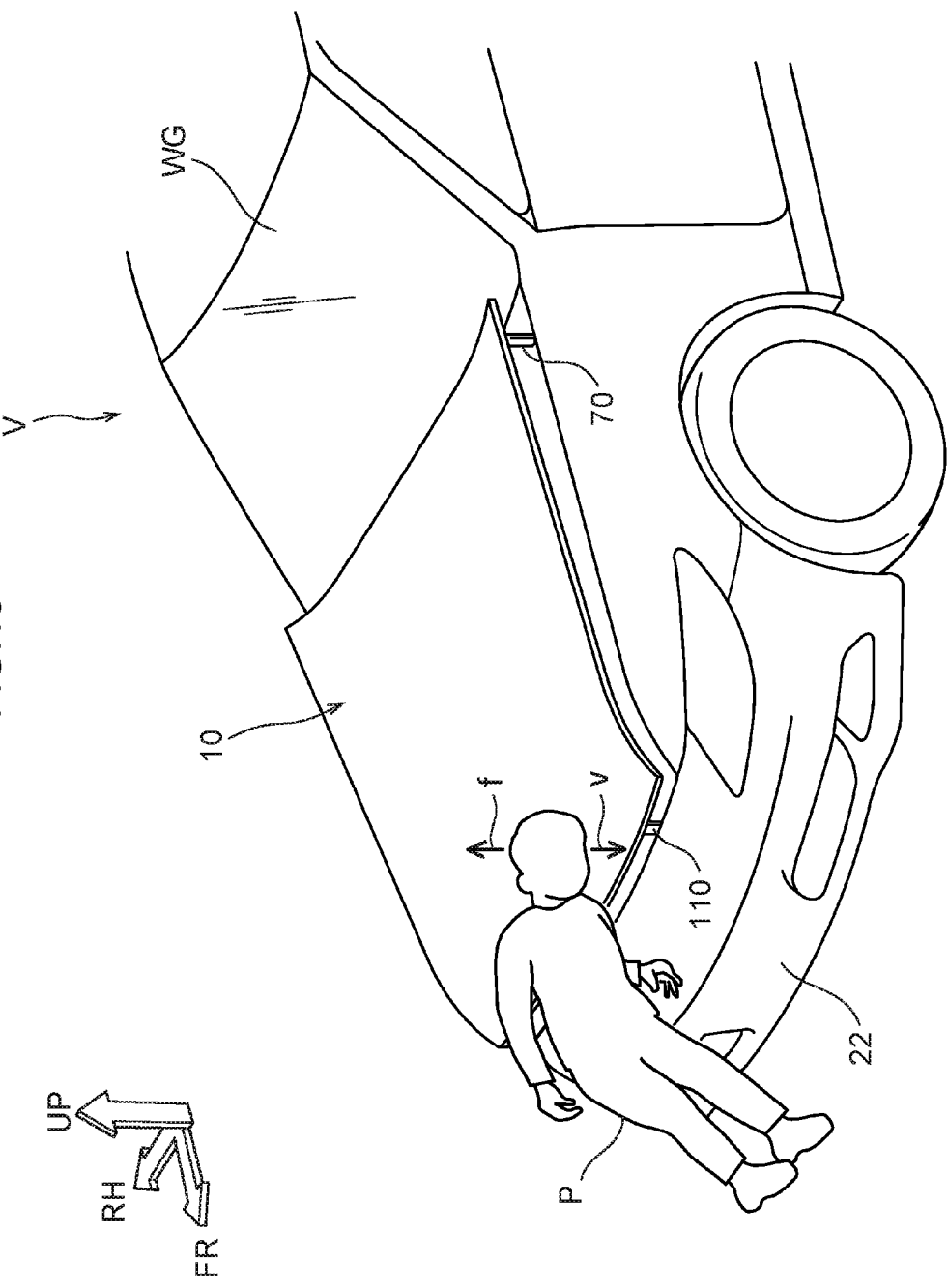
FIG. 10 is a perspective view illustrating a state in which a pedestrian falling onto the hood of the vehicle illustrated in FIG. 2 is lifted up together with the hood by a vehicle pop-up hood device, as viewed from a vehicle oblique-left front side.

As illustrated in FIG. 3 and FIG. 4, the rear PUH device 40 is configured including a hood hinge 44 that supports the hood 10 so as to be capable of opening and closing, and a rear side actuator 70 that actuates in the event of a collision with a collision body such as the pedestrian P (see FIG. 10).

Hood Hinge 44

The hood hinge 44 is configured including a hinge base 46 that is fixed to the vehicle body, a first arm 48 that is coupled to the hinge base 46 so as to be capable of swinging, and a second arm 54 that is fixed to the hood 10.

The hinge base 46 is formed substantially in an inverted L-shaped plate shape as viewed from the front of the vehicle, and is formed substantially in a V-shape opening toward the oblique upper front in side view as viewed from the vehicle width direction inner side (see FIG. 4 for more detail). Specifically, the hinge base 46 is configured including an attachment portion 46A with a plate thickness direction in the up-down direction, and a support portion 46B extending from a vehicle width direction inner side end portion of the attachment portion 46A toward the upper side. The attachment portion 46A is fixed to an upper face portion 20A of a cowl top side 20, this being a vehicle body side configuration member. Note that the cowl top sides 20 are provided on both sides of a cowl that extends along the vehicle width direction between a rear end side of the hood 10 and a lower end portion of a windshield glass WG.

The first arm 48 is disposed at the vehicle width direction inner side of the hinge base 46, and is formed substantially in an inverted triangular plate shape as viewed from the side. Specifically, as viewed from the side, the first arm 48 is formed substantially in an inverted triangular plate shape having vertices at a lower end portion 48A, a front end portion 48B disposed at a front side and upper side of the lower end portion 48A, and a rear end portion 48C disposed at a rear side and upper side of the lower end portion 48A.

A first hinge pin 50 with an axial direction in the vehicle width direction couples the rear end portion 48C of the first arm 48 to an upper end portion of the support portion 46B of the hinge base 46, so as to be capable of swinging. The first arm 48 is thereby configured so as to be capable of swinging relative to the hinge base 46 about the first hinge pin 50 (in the arrow A direction and the arrow B direction in FIG. 3). Moreover, the lower end portion 48A of the first arm 48 is provided with a first coupling shaft 52 that supports a lower end portion of the rear side actuator 70, described later. The first coupling shaft 52 is formed in a substantially circular column shape, and projects out from the first arm 48 toward the vehicle width direction inner side, with an axial direction in the vehicle width direction.

The second arm 54 is disposed at the vehicle width direction inner side of the first arm 48, and extends substantially along the front-rear direction. Specifically, the second arm 54 includes a side wall portion 54A disposed substantially parallel to the first arm 48. A second hinge pin 56 with an axial direction in the vehicle width direction couples a front end portion of the side wall portion 54A to the front end portion 48B of the first arm 48, so as to be capable of swinging. The second arm 54 is thereby configured so as to be capable of swinging relative to the first arm 48 about the second hinge pin 56 (in the arrow C direction and the arrow D direction in FIG. 3).

The second arm 54 includes a top wall portion 54B. The top wall portion 54B is bent from an upper end portion of the side wall portion 54A toward the vehicle width direction inner side, and extends substantially in the front-rear direction along the bottom wall 14A1 of the protruding portion 14A of the hood 10. The top wall portion 54B is penetrated by an attachment hole, not illustrated in the drawings, and a weld nut (not illustrated in the drawings) is fixed to the bottom wall 14A1 of the protruding portion 14A so as to correspond to the attachment hole. A hinge bolt, not illustrated in the drawings, is inserted into the attachment hole from the lower side and screwed together with the weld nut, thereby fastening (fixing) the top wall portion 54B to the hood 10.

The rear end section of the hood 10 is thereby coupled to the vehicle body by the hood hinge 44. A shear pin 58 projecting out toward the vehicle width direction outer side is provided at the side wall portion 54A of the second arm 54, and the second arm 54 is joined to the first arm 48 by the shear pin 58. Accordingly, in a non-actuated state of the rear side actuator 70, described later, the hood 10 opens up and closes off the engine room ER by the second arm 54 and the first arm 48 swinging about the first hinge pin 50.

Moreover, a rear end portion of the side wall portion 54A of the second arm 54 is integrally provided with a second coupling shaft 60 for coupling a cylinder 76 of the rear side actuator 70, described later. The second coupling shaft 60 is formed in a substantially circular column shape, and projects out from the side wall portion 54A toward the vehicle width direction inner side.

Rear Side Actuator 70

As illustrated in FIG. 3, the rear side actuator 70 is disposed at the vehicle width direction inner side of the first arm 48, and extends so as to span between the rear end portion of the side wall portion 54A and the lower end portion 48A of the first arm 48. Specifically, the rear side actuator 70 is inclined toward the rear side on progression toward the upper side as viewed from the side. Moreover, the rear side actuator 70 includes an actuator main body 72 and the cylinder 76.

The actuator main body 72 is formed in a substantially circular tube shape open at an upper end side. A lower end portion of the actuator main body 72 is swingably supported by the first coupling shaft 52 of the first arm 48. The lower end portion of the rear side actuator 70 is thereby configured capable of swinging relative to the first arm 48.

A gas generator 74 is provided inside the actuator main body 72. The gas generator 74 is formed in a substantially circular column shape, and is fitted inside the actuator main body 72. The gas generator 74 includes a squib (ignition device), and the inside of the gas generator 74 is filled with a gas generating agent. The gas generator 74 is electrically connected to the ECU 140 (see FIG. 2), described later, and configuration is made such that the gas generator 74 is actuated under the control of the ECU 140. When the gas generator 74 is actuated, the squib generates heat and the gas generating agent combusts, thereby supplying gas generated by the gas generator 74 into the actuator main body 72.

The cylinder 76 is formed substantially in a bottomed, circular tube shape. A portion on one axial direction side of the actuator main body 72 is housed inside the cylinder 76, and the cylinder 76 is configured so as to be capable of moving relative to the actuator main body 72 in the axial direction of the actuator main body 72. Note that an O-ring or the like, not illustrated in the drawings, forms a seal between the cylinder 76 and the actuator main body 72.

A cylinder coupling portion 78 is integrally provided at an upper end portion of the cylinder 76. The cylinder coupling portion 78 is formed in a substantially circular tube shape with an axial direction in the vehicle width direction. The second coupling shaft 60 of the second arm 54 is inserted into the cylinder coupling portion 78. An upper end portion of the cylinder 76 is thereby coupled so as to be capable of swinging relative to the second arm 54.

When the gas generated by the gas generator 74 is supplied into the cylinder 76, the cylinder 76 rises along the axial direction of the actuator main body 72 by the pressure of the gas. The rear end portion of the second arm 54 is thereby lifted toward the upper side by the cylinder 76, thereby disposing the hood 10 at a lifted position (the position illustrated by double-dotted intermittent lines in FIG. 7). When this occurs, the second arm 54 swings about the second hinge pin 56 so as to swing toward the upper side (toward the arrow C direction side in FIG. 3) relative to the first arm 48. Linked to the swinging of the second arm 54, the first arm 48 swings about the first hinge pin 50 so as to swing toward the upper side (toward the arrow A direction side in FIG. 3) relative to the hinge base 46.

The rear side actuator 70 includes a lock mechanism, not illustrated in the drawings. When the cylinder 76 has lifted the hood 10 to the lifted position due to actuation of the rear side actuator 70, the cylinder 76 is restricted from retracting by the lock mechanism.

Front PUH Device 80

Figure 5:
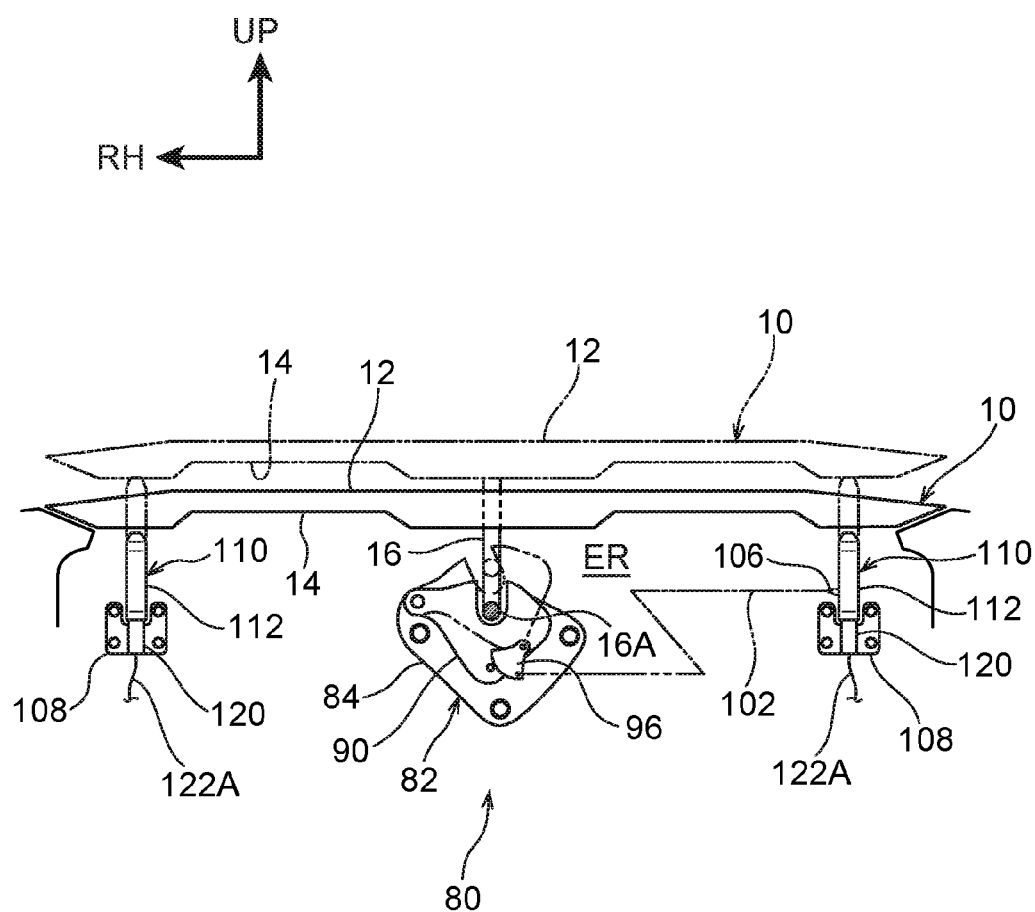
FIG. 5 is a front view schematically illustrating a front pop-up hood device illustrated in FIG. 2, as viewed from a vehicle front side.

As illustrated in FIG. 2 and FIG. 5, the front PUH device 80 is configured including the hood lock device 82 and a pair of left and right front side actuators 110 that actuate in the event of a collision with the pedestrian P.

Hood Lock Device 82

The hood lock device 82 is provided at a lower side of a vehicle width direction intermediate portion of the front end section of the hood 10. As illustrated in FIG. 5, the hood lock device 82 is configured including a lock base 84, a hood lock body 90, and a fixing plate 96.

Figure 6:
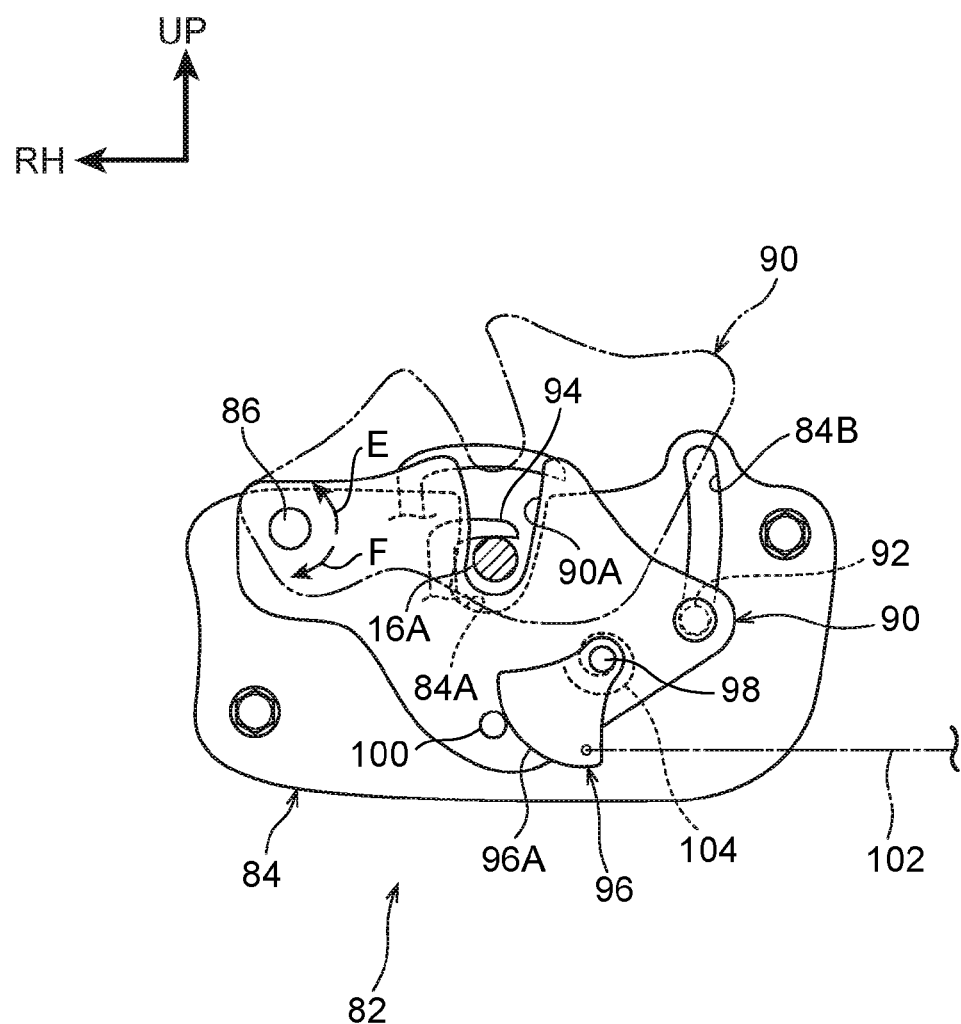
FIG. 6 is a front view illustrating an enlargement of a hood lock device illustrated in FIG. 5.

As illustrated in FIG. 6, the lock base 84 is formed substantially in a rectangular plate shape with a plate thickness direction in the front-rear direction. The lock base 84 is fastened and fixed to an upper member of a radiator support, not illustrated in the drawings. A vehicle width direction central portion of an upper portion of the lock base 84 is formed with an escape recess 84A opening toward the upper side as viewed from the front, and the anchor portion 16A of the hood striker 16 is disposed inside the escape recess 84A. A first support pin 86 that swingably supports the hood lock body 90, described later, is provided at a right side portion of the upper portion of the lock base 84. The first support pin 86 is formed in a substantially circular column shape, and projects out from the lock base 84 toward the front side with an axial direction in the front-rear direction. A guide hole 84B is formed in a left side portion of the upper portion of the lock base 84. The guide hole 84B extends in the up-down direction, and curves in a circular arc shape with its axial center at the center of the first support pin 86.

The hood lock body 90 is disposed at the front side of the lock base 84, and is formed in a substantially rectangular shape as viewed from the front. A right side end portion of the hood lock body 90 is swingably supported by the first support pin 86. The hood lock body 90 is thereby capable of swinging in the up-down direction (the arrow E and the arrow F directions in FIG. 6) relative to the lock base 84 by swinging about the first support pin 86.

A left side end portion of the hood lock body 90 is provided with a guide pin 92. The guide pin 92 is formed in a circular column shape, and projects out from the hood lock body 90 toward the rear side with an axial direction in the front-rear direction. The guide pin 92 is slidably inserted into the guide hole 84B of the lock base 84.

An upper portion of the hood lock body 90 is formed with an anchor recess 90A at a position at the front side of the escape recess 84A of the lock base 84. The anchor recess 90A is formed in a groove shape opening toward the upper side, and a width dimension of the anchor recess 90A is set so as to become larger on progression toward the upper side. In the closed position of the hood 10, the anchor portion 16A of the hood striker 16 is disposed at a lower end portion of the anchor recess 90A.

The hood lock body 90 is further provided with a latch 94. The anchor portion 16A disposed in the lower end portion of the anchor recess 90A is retained by the latch 94. A cable, not illustrated in the drawings, is connected to the latch 94. Operating the cable releases a retained state of the anchor portion 16A by the latch 94.

The fixing plate 96 is formed substantially in an open fan shape as viewed from the front, and is disposed at a front side of the hood lock body 90. A second support pin 98 with an axial direction in the front-rear direction couples a base end portion of the fixing plate 96 to the lock base 84 so as to be capable of swinging.

A curved portion at an outer peripheral portion of the fixing plate 96 configures a contact face 96A. The contact face 96A is formed in a circular arc shape with an axial center at the center of the second support pin 98. The contact face 96A abuts on a circular column shaped fixing pin 100 provided at the hood lock body 90, and in this state, prevents the hood lock body 90 from swinging toward the upper side (the arrow E direction side in FIG. 6).

One end of a cable 102 is anchored to the fixing plate 96. The other end of the cable 102 is anchored to a link mechanism 106 (see FIG. 5) that is engaged with the front side actuator 110, described later. When the cable 102 is pulled toward the left side, the fixing plate 96 is swung counterclockwise as viewed from the front, and the state of contact of the contact face 96A of the fixing plate 96 and the fixing pin 100 is released. The hood lock body 90 accordingly assumes a state in which the hood lock body 90 is capable of swinging toward the upper side (the arrow E direction side in FIG. 6), providing a configuration in which lifting of the front end section of the hood 10 is possible.

The hood lock body 90 is formed with an escape portion, not illustrated in the drawings, such that the fixing plate 96 and the second support pin 98 do not impinge on the hood lock body 90 when the hood lock body 90 swings. Moreover, the fixing plate 96 is biased toward a clockwise direction as viewed from the front by a spring 104.

Front Side Actuator 110

As illustrated in FIG. 5, the front side actuators 110 are respectively provided on the right side and the left side of the hood lock device 82. Each of the front side actuators 110 is formed in a substantially circular column shape with an axial direction in the up-down direction, and the lower end portion of each front side actuator 110 is fixed to a radiator support (the vehicle body), not illustrated in the drawings, through a plate shaped bracket 108. The front side actuators 110 are disposed at a slight separation to the lower side of both vehicle width direction end portions of the front end section of the hood 10. Explanation follows regarding configuration of the front side actuators 110.

FIG. 1A is a vertical cross-section illustrating a state of the front side actuator 110 prior to actuation. FIG. 1B is a vertical cross-section illustrating a state of the front side actuators 110 after actuation. As illustrated in FIG. 1A and FIG. 1B, the front side actuator 110 is configured including a cylinder 112, an actuator main body 120, this being an example of a "main body section" according to technology disclosed herein, and a retention mechanism 130.

The cylinder 112 is formed substantially in a bottomed, circular tube shape opening toward a lower side. An inner peripheral face at an upper end side (one axial direction side) of the cylinder 112 configures a general inner peripheral face 112A, this being an example of a "general face" according to technology disclosed herein. An inner peripheral face at an opening end side (other axial direction side) of the cylinder 112 configures an enlarged diameter portion 114 configuring the retention mechanism 130. As viewed in vertical cross-section, the enlarged diameter portion 114 is formed with a stepped shape, so as to enlarge an internal diameter of the cylinder 112, and is formed running around the entire circumferential direction of the cylinder 112. Specifically, the enlarged diameter portion 114 is configured including an enlarged diameter inner peripheral face 114A, this being an example of an "enlarged diameter face" according to technology disclosed herein, that is disposed along the axial direction of the cylinder 112 as viewed in vertical cross-section, and an inclined face 114B configuring a boundary portion between the enlarged diameter inner peripheral face 114A and the general inner peripheral face 112A. The internal diameter of the enlarged diameter inner peripheral face 114A is set larger than an internal diameter of the general inner peripheral face 112A, and is set larger than an external diameter of an O-ring 126, described later. The inclined face 114B is inclined toward the one axial direction side of the cylinder 112 on progression toward a radial direction inner side of the cylinder 112 as viewed in vertical cross-section.

Ahead portion 116 is provided at an opening end portion (lower end portion) of the cylinder 112. The head portion 116 is formed in a substantially circular tube shape, and is fitted (fixed) inside the enlarged diameter portion 114. An inner peripheral portion of the head portion 116 is formed with plural communication grooves 116A that penetrate the head portion 116 in the up-down direction and that are open at a radial direction inner side of the head portion 116. The communication grooves 116A impose a space G between the actuator main body 120, which is described below, and the cylinder 112, the space G being in communication with the exterior of the cylinder 112. Note that the plural communication grooves 116A are disposed at a specific spacing around the circumferential direction of the head portion 116.

The actuator main body 120 is formed in a substantially circular tube shape, and is disposed coaxially to the cylinder 112. An external diameter dimension of the actuator main body 120 is set smaller than an internal diameter dimension of the general inner peripheral face 112A of the cylinder 112. With the exception of a lower end portion, the actuator main body 120 is housed inside the cylinder 112 so as to be capable of moving relative to the cylinder 112. The lower end portion of the actuator main body 120 is fixed to the radiator support by the bracket 108, described above. In other words, the cylinder 112 covers a portion on one axial direction side of the actuator main body 120 so as to enable relative movement in the up-down direction. The space G is configured by a space between an inner peripheral portion of the cylinder 112 and an outer peripheral portion of the actuator main body 120.

The substantially circular column shaped gas generator 122 is fitted into an up-down direction intermediate portion of the actuator main body 120. The gas generator 122 is configured similarly to the gas generator 74 of the rear side actuator 70 described above. Namely, the gas generator 122 includes a squib (ignition device), and the inside of the gas generator 122 is filled with a gas generating agent. Wire harnesses 122A are connected to a lower end of the gas generator 122, and the gas generator 122 is electrically connected to the ECU 140 (see FIG. 2), described later, through the wire harnesses 122A. The gas generator 122 is accordingly actuated under the control of the ECU 140. When the gas generator 122 is actuated, gas generated by the gas generator 122 is supplied into the actuator main body 120. Note that the wire harnesses 122A extending out from a lower end of the gas generator 122 are laid out inside the actuator main body 120, and lead out from the lower end portion of the actuator main body 120 toward the outer side. The inside of the actuator main body 120 is filled with a resin material, thereby integrating the wire harnesses 122A and the actuator main body 120 together.

A first enlarged diameter portion 124 is formed projecting out toward the radial direction outer side at an upper end portion of the actuator main body 120. An external diameter dimension of the first enlarged diameter portion 124 is set slightly smaller than the internal diameter dimension of the general inner peripheral face 112A of the cylinder 112. An outer peripheral portion of the first enlarged diameter portion 124 is formed with a sealing groove portion 124A. The sealing groove portion 124A opens toward the radial direction outer side of the actuator main body 120, and is formed running around the entire peripheral direction of the first enlarged diameter portion 124. The O-ring 126, this being an example of a "sealing member" according to technology disclosed herein, configured by a rubber material or the like, is provided inside the sealing groove portion 124A. The O-ring 126 forms a seal between the actuator main body 120 and the cylinder 112 (the general inner peripheral face 112A). Namely, the O-ring 126 blocks off the inside of the cylinder 112 from the space G.

A second enlarged diameter portion 128 is formed at an outer peripheral portion of the actuator main body 120, at a position further toward a lower end side of the actuator main body 120 than the first enlarged diameter portion 124. An external diameter dimension of the second enlarged diameter portion 128 is set substantially the same as the external diameter dimension of the first enlarged diameter portion 124. A housing groove 128A configuring the retention mechanism 130 is formed at an outer peripheral portion of the second enlarged diameter portion 128. The housing groove 128A opens toward the radial direction outer side of the actuator main body 120, and is formed running around the entire peripheral direction of the actuator main body 120. Specifically, as viewed in vertical cross-section, the housing groove 128A is configured including a bottom face 128A1 disposed running in the axial direction (up-down direction) of the actuator main body 120, an upper face 128A2 extending from an upper end of the bottom face 128A1 toward the radial direction outer side of the actuator main body 120, and a lower inclined face 128A3 inclined from a lower end of the bottom face 128A1 toward the lower end side of the actuator main body 120 on progression toward the radial direction outer side of the actuator main body 120.

A C-ring 132, configuring the retention mechanism 130 and being an example of a "retention member" according to technology disclosed herein is disposed (housed) inside the housing groove 128A. The C-ring 132 is configured from a metal wire member with a circular cross-section profile, and is formed in a partially open annular shape (a ring shape, specifically, a substantially C-shape). The C-ring 132 has spring properties, and is configured so as to be capable of elastic deformation in its radial direction. The C-ring 132 is housed inner side the housing groove 128A in a state elastically deformed toward the radial direction inner side (having a reduced diameter) from a natural state (a state in which the C-ring 132 is not elastically deformed), and contacting the general inner peripheral face 112A of the cylinder 112 (see FIG. 1A).

When the gas generator 122 actuates, gas generated by the gas generator 122 is supplied into the actuator main body 120, and the cylinder 112 moves toward the upper side (rises) relative to the actuator main body 120 by the pressure of the gas inside the actuator main body 120. Configuration is thereby made such that an upper end portion of the cylinder 112 accordingly contacts the hood 10, and the front end section of the hood 10 is lifted to the lifted position (the position illustrated by double-dotted intermittent lines in FIG. 5 and FIG. 7). When the cylinder 112 moves toward the upper side relative to the actuator main body 120, the inner peripheral face (the general inner peripheral face 112A and the enlarged diameter inner peripheral face 114A) of the cylinder 112 is configured to slide against an outer peripheral portion of the C-ring 132, such that frictional force is generated between the C-ring 132 and the cylinder 112. As illustrated in FIG. 1B, at the lifted position, an upper end of the head portion 116 of the cylinder 112 abuts on a lower end of the second enlarged diameter portion 128, and an upper end of the enlarged diameter portion 114 of the cylinder 112 is configured so as to be disposed at the radial direction outer side of the actuator main body 120 with respect to the O-ring 126. Moreover, as described above, the internal diameter of the enlarged diameter portion 114 (the enlarged diameter inner peripheral face 114A) is set larger than the external diameter of the O-ring 126. Accordingly, configuration is made such that at the lifted position, a gap is formed between the O-ring 126 and the enlarged diameter portion 114, and the inside of the cylinder 112 and the space G are placed in communication with each other through the enlarged diameter portion 114. Configuration is thereby made such that the gas supplied into the cylinder 112 (actuator main body 120) is discharged (escapes) to the exterior of the cylinder 112 through the enlarged diameter portion 114. Note that the space G is partitioned into an upper portion and a lower portion by the C-ring 132. However, since the C-ring 132 is formed in a partially open annular shape, the upper portion and the lower portion of the space G are in communication with each other through the portion where the C-ring 132 is partially open. In order to improve the flow of gas from the upper portion to the lower portion of the space G, a communication groove (not illustrated in the drawings) may be formed penetrating the second enlarged diameter portion 128 in the up-down direction and opening toward the radial direction outer side of the actuator main body 120.

As illustrated in FIG. 5, the link mechanism 106 is engaged with the cylinder 112 of the front side actuator 110 disposed on the left side of the hood lock device 82, and the other end of the cable 102 described above is anchored to the link mechanism 106. When the cylinder 112 rises during actuation of the front side actuator 110, the link mechanism 106 is actuated and the cable 102 is pulled toward the left side. Accordingly, configuration is made such that during actuation of the front side actuator 110, the state of contact of the contact face 96A of the fixing plate 96 with the fixing pin 100 is released, enabling lifting of the front end section of the hood 10.

In the present exemplary embodiment, the lifting force (actuation force) of the front side actuators 110 is set such that the hood 10 can be lifted together with a pedestrian P falling onto the hood 10. Moreover, when the gas inside the cylinder 112 escapes following actuation of the front side actuator 110 and a specific collision load toward the lower side is input to the cylinder 112 through the hood 10, the cylinder 112 moves toward the lower side relative to the actuator main body 120, against the frictional force between the C-ring 132 and the cylinder 112. As illustrated in FIG. 9B, when the cylinder 112 moves toward the lower side relative to the actuator main body 120, the C-ring 132 is gripped in the up-down direction between the inclined face 114B of the enlarged diameter portion 114 and the lower inclined face 128A3 of the housing groove 128A, such that the cylinder 112 engages with the C-ring 132. The cylinder 112 is thereby restricted from retracting, and the hood 10 is retained at the lifted position by the retention mechanism 130. This position is referred to below as the retention position.

Explanation follows regarding the specific collision load. The collision load is set based on pedestrian head protection performance testing as stipulated by the Japan New Car Assessment Program (JNCAP). Namely, the collision load is defined as the load acting on (input to) the cylinder 112 when a head impactor, this being a collision body simulating the head of an adult or child, collides with the hood 10 from a testing machine. In a collision between the vehicle and a pedestrian, a pedestrian with a comparatively small physical build, such as a child, will tend to fall predominantly onto the front end section of the hood 10. Accordingly, in the present exemplary embodiment, the load that acts on (is input to) the cylinder 112 when a head impactor modelled on a child with a small physical build collides with the front end section of the hood 10 is set as the collision load.

ECU 140

As illustrated in FIG. 2, a collision detection sensor 142 and a collision prediction sensor 144 are electrically connected to the ECU 140. The ECU 140 determines whether or not to actuate the rear side actuators 70 and the front side actuators 110 based on signals output from the collision detection sensor 142 and the collision prediction sensor 144. First, explanation is given regarding the collision detection sensor 142 and the collision prediction sensor 144, followed by explanation regarding the ECU 140.

The collision detection sensor 142 is installed at a front face of bumper reinforcement (not illustrated in the drawings) of a front bumper 22 disposed at a front end section of the vehicle V. The collision detection sensor 142 is configured including a substantially elongated pressure tube 142A with a length direction in the vehicle width direction, and pressure sensors 142B provided at both length direction ends of the pressure tube 142A. Configuration is made such that when a collision body such as the pedestrian P collides with the front bumper 22, the pressure inside the pressure tube 142A changes, and signals corresponding to the pressure change inside the pressure tube 142A are output from the pressure sensors 142B to the ECU 140. Note that the collision detection sensor 142 may also have a configuration employing pressure chambers or optical fibers.

The collision prediction sensor 144 is configured by a stereo camera. The stereo camera is provided in the vicinity of the vehicle width direction center of an upper portion of the windshield glass WG The stereo camera photographs the front side of the vehicle V, and detects a collision body that could collide with the vehicle V. The stereo camera measures the distance to the detected collision body, the relative speed between the vehicle V and the collision body, and the like, and outputs the measurement data to the to the ECU 140. Note that the collision prediction sensor 144 may also be configured by a millimeter wave radar or the like.

The ECU 140 then computes a collision load based on the output signals of the pressure sensors 142B described above, and also computes a collision speed based on the output signals of the collision prediction sensor 144. Moreover, the ECU 140 finds an effective mass for the collision body from the computed collision load and collision speed, determines whether or not the effective mass exceeds a threshold value, and determines whether the collision body that could collide with the vehicle V is the pedestrian P or something other than the pedestrian P (for example, a roadside obstacle such as a roadside marker or a guide post). Configuration is made such that the PUH device 30 is actuated by the ECU 140 when the ECU 140 has determined that the collision body that could collide with the vehicle V is the pedestrian P.

The front side actuators 110 are set so as to actuate before the rear side actuators 70 during actuation of the PUH device 30. Specifically, configuration is made such that when the pedestrian P has collided with the front bumper 22, the front side actuator 110 is actuated by the ECU 140 either at the same time as the body of the pedestrian P falls onto the hood 10 and contacts the front end section of the hood 10, or after the body of the pedestrian P has contacted the front end section of the hood 10. In other words, an actuation timing of the front side actuator 110 is set to after a first specific duration has elapsed from the time of the collision between the pedestrian P and the front bumper 22.

In the present exemplary embodiment, the first specific duration is set by measuring the time taken for a dummy falling onto the hood 10 to contact the front end section of the hood 10 by carrying out crash tests using a dummy. Specifically, the first specific duration (15 msec in the present exemplary embodiment) is set by measuring the time taken for a dummy to contact the front end section of the hood 10 when the vehicle V travelling at a speed of 40 km/h collides with a dummy modeled on a child (6 year old child). Note that crash testing has revealed that the time taken for the dummy falling onto the hood 10 to contact the front end section of the hood 10 is substantially the same when employing a dummy modeled on an adult (for example, a dummy covering 50% of American adult males (AM50)) as when employing a dummy modeled on a child (6 year old child). Accordingly, the first specific duration is set so as to be able to correspond to anyone from a child to an adult.

The ECU 140 is set to actuate the rear side actuators 70 after a second specific duration has elapsed following the start of actuation of the front side actuators 110. Specifically, the second specific duration (the actuation timing of the rear side actuators 70) is set such that the head of the pedestrian P strikes the hood 10 after actuation of the rear side actuators 70 has completed. Note that the second specific duration is also set by carrying out crash testing using various dummy types. Moreover, the first specific duration and the second specific duration are set corresponding to the vehicle type.

Next, explanation follows regarding operation and advantageous effects of the present exemplary embodiment.

In the non-actuated state of the PUH device 30, the hood 10 is disposed at the closed position, and the engine room ER is closed off by the hood 10 (see the hood 10 illustrated by solid lines in FIG. 7). From this state, in the event of a frontal collision between a collision body such as the pedestrian P and the vehicle V, the collision detection sensor 142 detects that there has been a frontal collision with the collision body, and a signal is output from the collision detection sensor 142 to the ECU 140. When this is performed, using the collision detection sensor 142 and the collision prediction sensor 144, the ECU 140 determines whether the collision body that has collided with the vehicle V is the pedestrian P or something other than the pedestrian P. The PUH device 30 is actuated by the ECU 140 when the ECU 140 determines the collision body that has collided with the vehicle V to be the pedestrian P.

During actuation of the PUH device 30, first, the gas generator 122 of each front side actuator 110 is actuated under the control of the ECU 140. Specifically, the gas generator 122 is actuated 15 msec after the start of the collision between the pedestrian P and the vehicle V, and gas is supplied into the actuator main body 120. When gas is supplied into the actuator main body 120, the cylinder 112 is pushed by the pressure of the gas inside the actuator main body 120, and the cylinder 112 moves (rises) toward the upper side relative to the actuator main body 120. When this occurs, the cable 102 of the front PUH device 80 is pulled toward the left side, linked to the movement of the cylinder 112. The fixing plate 96 accordingly swings, enabling the hood lock body 90 to swing toward the upper side. Namely, lifting of the front end section of the hood 10 is enabled. When the cylinder 112 moves toward the upper side, the upper end portion of the cylinder 112 contacts the hood 10 and lifts the front end section of the hood 10 toward the upper side. The front end section of the hood 10 is thereby lifted to the lifted position (see the double-dotted intermittent lines in FIG. 5).

After the second specific duration has elapsed following the start of actuation of the front side actuators 110, the gas generator 74 of each rear side actuator 70 is actuated under the control of the ECU 140, thereby supplying gas inside the actuator main body 72. The cylinder 76 thereby moves (rises) in the axial direction toward the upper side with respect to the actuator main body 72 by the pressure of the gas inside the actuator main body 72. When the cylinder 76 rises, the cylinder 76 lifts the rear end portion of the second arm 54 toward the upper side, lifting the rear end section of the hood 10 to the lifted position. In this manner, the front end section and the rear end section of the hood 10 are lifted to the lifted position, and a spacing between the inside of the engine room ER and the hood 10 is secured.

Next, explanation follows regarding the actuation state of the front side actuator 110 and the state of the pedestrian P in chronological order when the pedestrian P collides with the front bumper 22. The state illustrated in FIG. 8A is a state prior to actuation of the front side actuator 110. When the pedestrian P collides with the front bumper 22, predominantly the legs of the pedestrian P strike the front bumper 22, such that the pedestrian P falls onto the hood 10 from the front end side of the hood 10. The front side actuator 110 is actuated by the ECU 140 either at the same time as the body of the pedestrian P falling onto the hood 10 contacts the front end section of the hood 10, or after the body of the pedestrian P has contacted the front end section of the hood 10.

As illustrated in FIG. 8B, when the front side actuator 110 actuates, the cylinder 112 instantaneously moves (rises) toward the upper side relative to the actuator main body 120 by the gas generated by the gas generator 122. The front side actuator 110 accordingly lifts the front end section of the hood 10 together with the lumbar and upper body of the pedestrian P falling onto the hood 10. Namely, the pedestrian P falls onto the hood 10 while the lumbar and upper body of the pedestrian P are lifted. A load f (see FIG. 10) toward the upper side accordingly acts on the body of the pedestrian P falling onto the hood 10, thereby enabling a head velocity v (see FIG. 10) of the pedestrian P falling onto the hood 10 toward the lower side to be reduced. Note that when the cylinder 112 rises with respect to the actuator main body 120, the enlarged diameter portion 114 of the cylinder 112 is disposed at the radial direction outer side of the actuator main body 120 with respect to the C-ring 132, and the C-ring 132 elastically deforms toward the radial direction outer side and contacts the enlarged diameter inner peripheral face 114A of the enlarged diameter portion 114.

Note that as illustrated in FIG. 9A, when the cylinder 112 (hood 10) has risen further from the state illustrated in FIG. 8B and has been lifted to the lifted position, an upper end portion of the enlarged diameter portion 114 of the cylinder 112 is disposed at the radial direction outer side of the actuator main body 120 with respect to the O-ring 126 of the actuator main body 120. The internal diameter dimension of the enlarged diameter portion 114 (enlarged diameter inner peripheral face 114A) is set larger than the external diameter dimension of the O-ring 126. Accordingly, the inside of the cylinder 112 and the space G between the cylinder 112 and the actuator main body 120 are placed in communication with each other through the enlarged diameter portion 114. The gas inside the cylinder 112 is thereby discharged to the exterior of the cylinder 112 through the enlarged diameter portion 114, the space G, and the communication grooves 116A of the head portion 116 (see the arrows H in FIG. 9A). Namely, gas inside the cylinder 112 can be discharged to the exterior without forming gas escape holes in the cylinder 112. Accordingly, the effect of the assembly precision of the front side actuator 110 on actuation of the front side actuator 110 can be suppressed.

Namely, supposing gas escape holes were to be formed in the cylinder 112, it is possible that due to assembly variation in the front side actuator 110, the peripheries of openings of the gas escape holes could catch on the C-ring 132 when the cylinder 112 moves. There would accordingly be a need for high assembly precision of the front side actuator 110 in order to prevent the peripheries of the openings of gas escape holes from catching on the C-ring 132. In other words, in such cases, there is a possibility that actuation of the front side actuator 110 could be affected by the assembly precision of the front side actuator 110. In contrast, as described above, the present exemplary embodiment enables the gas inside the cylinder 112 to be discharged to the exterior without forming gas escape holes in the cylinder 112. Actuation of the front side actuator 110 is therefore not affected by the peripheries of the openings of gas escape holes, enabling movement of the cylinder 112. This thereby enables the effect of the assembly precision of the front side actuator 110 on actuation to be suppressed in comparison to configurations in which gas escape holes are formed in the cylinder 112.

In this state, the gas inside the cylinder 112 is discharged to the exterior, thereby achieving a state in which high pressure gas is suppressed from remaining in the cylinder 112. Accordingly, in this state, a reaction force from the hood 10 on the head of the pedestrian P when the head of the pedestrian P falling onto the hood 10 strikes the hood 10 can be reduced. The cylinder 112 moves toward the lower side relative to the actuator main body 120 against the frictional force between the C-ring 132 and the cylinder 112 when a specific collision load toward the lower side acts on the cylinder 112 due to the head of the pedestrian P striking the hood 10. Namely, the cylinder 112 moves toward the lower side relative to the actuator main body 120 while the enlarged diameter inner peripheral face 114A of the enlarged diameter portion 114 slides against the outer peripheral portion of the C-ring 132. This thereby enables collision energy to the head of the pedestrian P to be absorbed by the frictional force. In particular, collision energy to the head of a pedestrian P with a small build can be absorbed since there is a tendency for the head of the pedestrian P falling onto the hood 10 to strike predominantly the front end section of the hood 10 in a collision between a pedestrian P with a small build and the vehicle V. This thereby enables the injury criteria of the pedestrian P to be lowered, while suppressing the effect of assembly precision of the front side actuator 110 on actuation of the front side actuator 110.

As illustrated in FIG. 9B, when the cylinder 112 reaches the retention position as a result of the cylinder 112 moving toward the lower side relative to the actuator main body 120, the inclined face 114B of the enlarged diameter portion 114 engages with the C-ring 132, restricting movement of the cylinder 112 toward the lower side. The cylinder 112 (hood 10) is thereby retained at the retention position. This thereby enables the cylinder 112 (hood 10) to be retained at the retention position by utilizing the inclined face 114B of the enlarged diameter portion 114.

Figure 11:
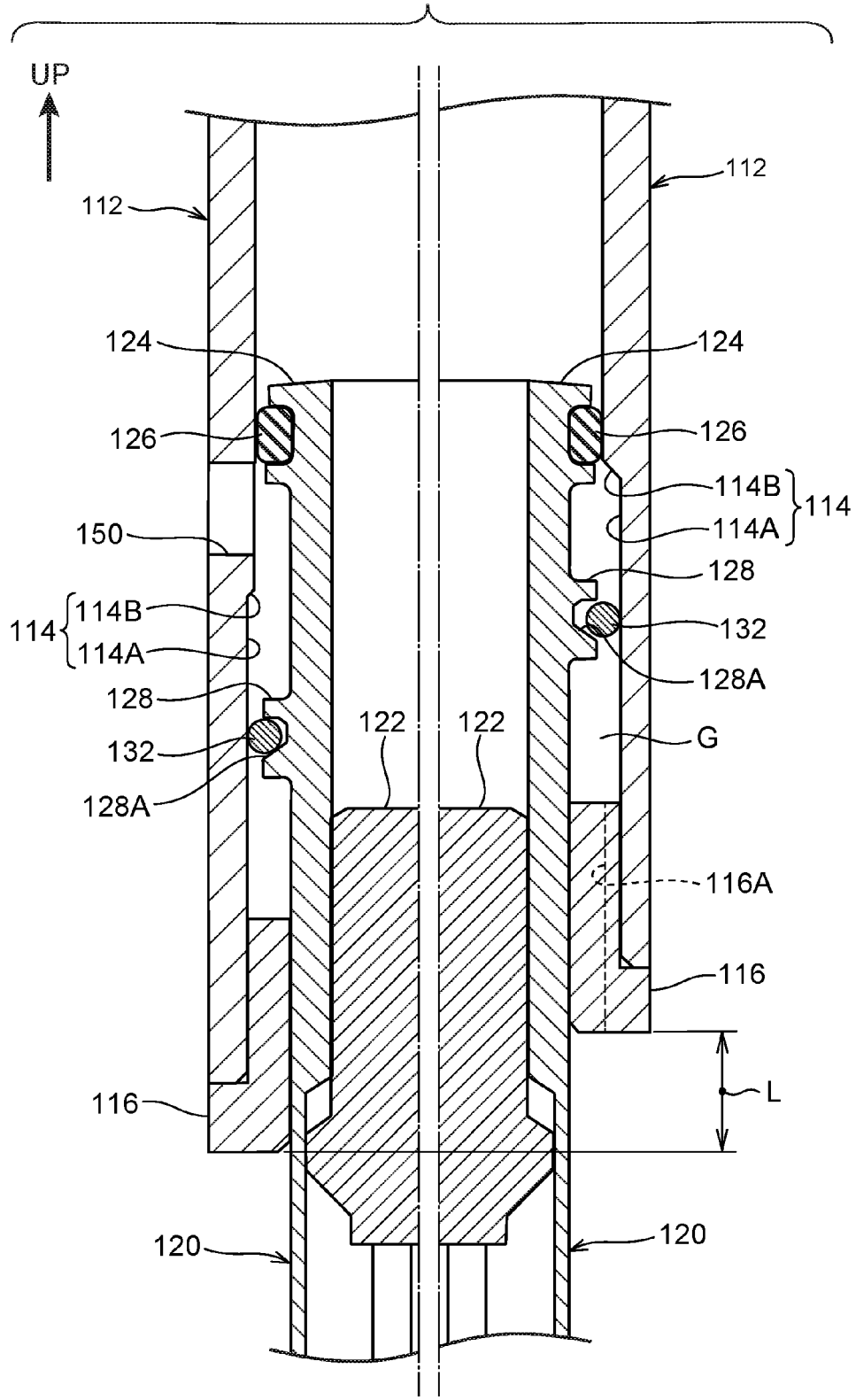
FIG. 11 is an explanatory diagram to explain the front actuator illustrated in FIG. 8B alongside a comparative example.

Due the configuration by which the C-ring 132 engages with the inclined face 114B of the enlarged diameter portion 114 to retain the cylinder 112 (hood 10) at the retention position, the axial direction length of the cylinder 112 can be made shorter than in cases in which, for example, gas escape holes are formed in the cylinder 112. Explanation follows regarding this point, with reference to FIG. 11. FIG. 11 comparatively illustrates relevant portions of a front side actuator of a comparative example, and relevant portions of the front side actuator 110 of the present exemplary embodiment. The front side actuator of the comparative example is illustrated in vertical cross-section on the left side of the single-dotted intermittent lines in FIG. 11, and the front side actuator 110 of the present exemplary embodiment is illustrated in vertical cross-section on the right side of the single-dotted intermittent lines in FIG. 11. In the front side actuator of the comparative example illustrated in FIG. 11, members configured similarly to those of the present exemplary embodiment are allocated the same reference numerals. Moreover, FIG. 11 illustrates a state immediately prior to gas escaping from inside the cylinder 112.

As illustrated in FIG. 11, in the front side actuator of the comparative example, a gas escape hole 150 is formed in the cylinder 112. The position of the gas escape hole 150 is set at the upper side of the inclined face 114B that engages with the C-ring 132 at the retention position. In other words, the inclined face 114B is disposed further to the lower side than the gas escape hole 150. Accordingly, the inclined face 114B and the C-ring 132 are disposed further to the lower side than in the present exemplary embodiment. Namely, in the present exemplary embodiment, the inclined face 114B configuring the upper end portion of the enlarged diameter portion 114 through which gas escapes from inside the cylinder 112 functions as a face that engages with the C-ring 132, and so the inclined face 114B and the C-ring 132 can be disposed further toward the upper side than in the comparative example by an amount commensurate with a diameter dimension of the gas escape hole 150. Accordingly, the axial direction length of the cylinder 112 of the present exemplary embodiment can be made shorter than the axial direction length of the cylinder 112 of the comparative example (see arrow L in FIG. 11). The present exemplary embodiment thereby enables a contribution to be made to reducing the size of the front side actuator 110, and also enables a reduction in weight of the front side actuator 110.

The inclined face 114B of the enlarged diameter portion 114 is inclined toward the one axial direction side of the cylinder 112 on progression toward the radial direction inner side of the cylinder 112. Accordingly, the O-ring 126 and the C-ring 132 can be suppressed from catching on the inclined face 114B when the actuator main body 120 is inserted into the cylinder 112 compared to cases in which, for example, the inclined face 114B side disposed running in a direction orthogonal to the axis of the cylinder 112. Damage to the O-ring 126 and the C-ring 132 is accordingly further suppressed, enabling the reliability of the front side actuator 110 to be improved.

In the present exemplary embodiment, the C-ring 132 is formed with a partially open C-shaped ring profile, and has spring properties. In a reduced-diameter state of the C-ring 132, the C-ring 132 abuts on the general inner peripheral face 112A of the cylinder 112, and is housed inside the housing groove 128A of the actuator main body 120. This thereby enables the C-ring 132 that retains the cylinder 112 at the retention position to be suppressed from being exposed to the exterior of the cylinder 112.

The PUH device 30 includes the rear side actuators 70 in addition to the front side actuators 110. The rear end section of the hood 10 is thereby lifted by the rear side actuators 70. This thereby enables the head of a pedestrian P of comparatively large build falling onto the hood 10 to strike the hood 10 earlier than, for example, in cases in which the rear end section of the hood 10 is not lifted. The collision energy to the head of the pedestrian P can be reduced as a result.

In the present exemplary embodiment, the rear side actuators 70 are actuated by the ECU 140 after actuation of the front side actuators 110. This thereby enables the front end section of the hood 10 to be lifted by the front side actuators 110 at an early stage.

Explanation follows regarding this point. When the rear side actuators 70 actuate, the rear end section of the hood 10 is lifted, such that a rotation moment acts on the hood 10 about the center of gravity of the hood 10 as viewed from the side, displacing the front end section of the hood 10 toward the lower side. Accordingly, if the rear side actuators 70 and the front side actuators 110 were to be actuated at the same time as each other, the rotation moment acting on the hood 10 would affect lifting of the hood 10 by the front side actuators 110. As a result, there would be a possibility of lifting of the front end section of the hood 10 being delayed.

In contrast, in the present exemplary embodiment, the rear side actuators 70 are actuated by the ECU 140 after actuation of the front side actuators 110. Accordingly, since the rear side actuators 70 are not actuated at the start of actuation of the front side actuators 110, the rotation moment described above does not act on the hood 10 during initial actuation of the hood 10 by the front side actuators 110. The front end section of the hood 10 can accordingly be lifted by the front side actuators 110 without being affected by rotation moment arising in the hood 10 until the rear side actuators 70 are actuated. This thereby enables the front end section of the hood 10 to be lifted at an early stage.

Note that in the present exemplary embodiment, configuration is made such that retraction of the cylinder 76 with respect to the actuator main body 72 is restricted by the lock mechanism, not illustrated in the drawings, of the rear side actuator 70. Alternatively, the enlarged diameter portion 114 and the retention mechanism 130 may also be provided at the rear side actuators 70, similarly to in the front side actuators 110. Namely, configuration may be made such that gas inside the cylinder 76 escapes following actuation of the rear side actuators 70, and the rear end section of the hood 10 is displaced toward the lower side when a specific collision load acts on the rear end section of the hood 10.

In the present exemplary embodiment, configuration is made such that the front side actuators 110 are actuated by the ECU 140 either at the same time as the body of the pedestrian P falling onto the hood 10 contacts the front end section of the hood 10, or after the body of the pedestrian P contacts the front end section of the hood 10. However, the actuation timing of the front side actuators 110 may be set as desired according to the vehicle type.

In the present exemplary embodiment, configuration is made such that the vehicle width direction central portion of the front end section of the hood 10 is locked by the hood lock device 82 of the front PUH device 80. Alternatively, configuration may be made in which both vehicle width direction end portions of the front end section of the hood 10 are locked by the front PUH device 80.

In the present exemplary embodiment, configuration is made in which both vehicle width direction end portions of the front end section of the hood 10 are lifted by the pair of left and right front side actuators 110 of the front PUH device 80. Alternatively, configuration may be made in which one out of the pair of front side actuators 110 is omitted, and a vehicle width direction central portion of the front end section of the hood 10 is lifted by the remaining front side actuator 110.

All cited documents, patent applications, and technical standards mentioned in the present specification are incorporated by reference in the present specification to the same extent as if the individual cited document, patent application, or technical standard was specifically and individually indicated to be incorporated by reference.

What is claimed is:

1. A vehicle pop-up hood device actuator, comprising:
    a main body section that is formed in a tube shape, and that internally includes a gas generator;
    a cylinder that is formed in a bottomed tube shape closed off at one axial direction side, that has an inner peripheral face at the one axial direction side configuring a general face, that covers a portion at the one axial direction side of the main body section, that is moved toward the one axial direction side of the main body section by gas generated by the gas generator to lift a hood of a vehicle to a lifted position, and that is configured so as to be capable of moving to a retention position further toward another axial direction side of the main body section than the lifted position;
    a sealing member that is formed in a ring shape, that is provided at an outer peripheral portion at one axial direction end portion of the main body section, and that forms a seal between the main body section and the general face;
    a retention member that is provided at the outer peripheral portion of the main body section at a position further toward the another axial direction side of the main body section than the sealing member, that abuts on the inner peripheral face of the cylinder, and that retains the cylinder by engaging with the cylinder at the retention position; and
    an enlarged diameter face that configures an inner peripheral face at the another axial direction side of the cylinder, that has an internal diameter set larger than both an internal diameter of the general face and an external diameter of the sealing member, and that is disposed at a radial direction outer side of the main body section with respect to the sealing member at the lifted position.

2. The vehicle pop-up hood device actuator of claim 1, wherein a boundary portion between the enlarged diameter face and the general face at the inner peripheral face of the cylinder configures an inclined face, and the inclined face is inclined toward the one axial direction side on progression toward a radial direction inner side of the cylinder as viewed in vertical cross-section.

3. The vehicle pop-up hood device actuator of claim 2, wherein the inclined face engages with the retention member at the retention position.

4. A vehicle pop-up hood device, comprising:
    the vehicle pop-up hood device actuator of claim 1, provided at a lower side of a hood of a vehicle; and
    a controller that is electrically connected to the vehicle pop-up hood device actuator, and that actuates the vehicle pop-up hood device actuator.

* * * * *